(12) United States Patent
Sato et al.

(10) Patent No.: US 6,267,708 B1
(45) Date of Patent: Jul. 31, 2001

(54) METHOD OF DETECTING TORQUE PHASE START IN CLUTCH TO CLUTCH SPEED SHIFT OF VEHICULAR AUTOMATIC TRANSMISSION, METHOD OF DETECTING TORQUE INTERFERENCE INTENSITY AND SHIFT CONTROL APPARATUS OF VEHICULAR AUTOMATIC TRANSMISSION

(75) Inventors: Katsutoshi Sato, Toyoake; Fuyumi Kimura, Chiryu, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/450,718

(22) Filed: Nov. 30, 1999

(30) Foreign Application Priority Data

Nov. 30, 1998 (JP) .................................... 10-340531

(51) Int. Cl.[7] .................................... F16H 61/08
(52) U.S. Cl. ...................... 477/120; 477/143; 477/155
(58) Field of Search ................... 477/120, 143, 477/154, 155; 475/123, 128

(56) References Cited

U.S. PATENT DOCUMENTS 5,063,814 * 11/1991 Baba et al. ........................ 477/154
5,473,543 * 12/1995 Nozaki et al. ..................... 477/148
6,094,613 * 7/2000 Ochi et al. ......................... 477/34
6,183,395 * 2/2001 Ochi et al. ........................ 477/143

* cited by examiner

Primary Examiner—Sherry Estremsky
(74) Attorney, Agent, or Firm—Burns, Doane, Swecker & Mathis, LLP

(57) ABSTRACT

To relatively precisely detect the start of torque phase for relatively precisely restraining speed shift shock caused by torque interference in clutch to clutch speed shift, an output from an input shaft rotational speed sensor at a reduction gear unit is passed through a secondary Butterworth high pass filter which is a digital filter having a cutoff frequency of 1.0 Hz to remove a change component caused by acceleration of the vehicle. A filter output Ni_fil which is a change component by generation of transmission torque of an engaged side clutch is thus provided. When this filter output Ni_fil falls to less than a first threshold value of −ref1 and thereafter becomes less than a second threshold value of −ref2 without recovering to be equal to or higher than the first threshold value of −ref1, it is determined to be the start of the torque phase.

8 Claims, 14 Drawing Sheets

Fig. 2

| | Operational states of the clutches and the brakes | | | | | Operational states of the electromagnetic valves | | | |
|---|---|---|---|---|---|---|---|---|---|
| | | | | | | Nomally-opened valves | | Nomally-closed valves | |
| | C1 | C2 | B0 | B1 | B2 | SOL1 | SOL2 | SOL3 | SOL4 |
| P | ○ | | | | | × | × | × | × |
| R | ○ | | | | ○ | × | × | × | × |
| N | ○ | | | | | × | × | × | × |
| 1st | ○ | | | ○ | | × | ○ | ○ | × |
| 2nd | | ○ | | ○ | | ○ | × | ○ | × |
| 3rd | ○ | ○ | | | | × | × | × | × |
| 4th | | ○ | ○ | | | ○ | × | × | ○ |

METHOD OF DETECTING TORQUE PHASE START IN CLUTCH TO CLUTCH SPEED SHIFT OF VEHICULAR AUTOMATIC TRANSMISSION, METHOD OF DETECTING TORQUE INTERFERENCE INTENSITY AND SHIFT CONTROL APPARATUS OF VEHICULAR AUTOMATIC TRANSMISSION

This application is based on and claims priority under 35 U.S.C. § 119with respect to Japanese Application No. 10(1998)-340531 filed on Nov. 30, 1998, the entire content of which is incorporated herein by reference.

FIELD OF THE INVENTION

The present invention generally relates to a vehicular automatic transmission. More particularly, the present invention pertains to a speed shift control apparatus of a vehicular automatic transmission and a method of detecting the start of a torque phase in clutch to clutch speed shift of a vehicular automatic transmission.

BACKGROUND OF THE INVENTION

When switching between two speed stages of a vehicular automatic transmission is carried out, there must frequently be carried out simultaneously engagement and release of two frictional engaging elements, including a so-called speak clutch for connecting and disconnecting two rotating members and a so-called speak brake for connecting and disconnecting a rotating member and a fixed member. Such a speed shift is referred to as clutch to clutch speed shift.

By way of example, in the vehicular automatic transmission shown in FIG. 1, the speed shift constitutes clutch to clutch speed shift between a forward first speed stage and a forward second speed stage. The vehicular automatic transmission is provided with a torque converter 10, a transmission gear unit 20, a hydraulic control apparatus 30, an electric control apparatus 40 and various sensor groups 50.

The torque converter 10 is provided with a front cover 101 connected to integrally rotate with an engine output shaft, a pump impeller 102 integrally connected to the front cover 101, a turbine runner 103 rotatably arranged relative to the front cover 101 and the pump impeller 102 in a chamber surrounded by the front cover 101 and the pump impeller 102, and a stator 104.

The transmission gear unit 20 is provided with an input shaft 101 connected to integrally rotate with the turbine runner 103 of the torque converter 10, an output shaft 202 rotatably connected to the wheels, a first planetary gear mechanism 203, a second planetary gear mechanism 204 a carrier of which is connected to integrally rotate with a ring gear of the first planetary gear mechanism 203 and a ring gear of which is connected to integrally rotate with a carrier of the first planetary gear mechanism 203, and a gear mechanism 205 rotatably connected with the carrier of the first planetary gear mechanism 203, the ring gear of the second planetary gear mechanism 204 and the output shaft 202. In addition, a first clutch C1 which is a hydraulically-operated frictional engaging element rotatably and selectively connects and disconnects a sun gear of the second planetary gear mechanism 204 and the input shaft 201, a second clutch C2 which is a hydraulically-operated frictional engaging element selectively connects and disconnects the ring gear of the first planetary gear mechanism 203 as well as the carrier of the second planetary gear mechanism 204 and the input shaft 201, a first brake B0 which is a hydraulically-operated frictional engaging element selectively connects and disconnects the sun gear of the second planetary gear mechanism 204 and a fixed member, a second brake B1 which is a hydraulically-operated frictional engaging element selectively connects and disconnects a sun gear of the first planetary gear mechanism 203 and a fixed member, and a third brake B2 which is a hydraulically-operated frictional engaging element selectively connects and disconnects the ring gear of the first planetary gear mechanism 203 as well as the carrier of the second planetary gear mechanism 204 and a fixed member. Both of the clutches C1, C2 and the brakes B0, B1, B2 are of a well-known multiple disk type.

The above-described speed shift unit 20 can carry out speed shift among one rearward speed stage and four forward speed stages. FIG. 2 shows an engaging operation table of the respective clutches and the respective brakes for setting these speed stages. In FIG. 2, notation P designates parking, notation R designates rearward speed stage, notation N designates neutral, notation 1st designates forward first speed stage, notation 2nd designates forward second speed stage, notation 3rd designates forward third speed stage and notation 4th designates forward fourth speed stage, respectively. Further, marked areas designate engaged states and blank areas designate released states.

As is apparent from FIG. 2, speed shift between the forward first speed stage and the forward second speed stage constitutes clutch to clutch speed shift of the first clutch C1 and the second clutch C2. In up shift from the forward first speed stage to the forward second speed stage, the second clutch C2 is switched from release to engagement and at the same time, the first clutch C1 is switched from engagement to release.

Engagement and release of the respective clutches and the respective brakes are executed by controlling four electromagnetic valves provided to the hydraulic control apparatus 30 (SOL1 and SOL2 which are normally-opened valves and SOL3 and SOL4 which are normally-closed valves shown in FIG. 2) in duty control by the electric control apparatus 40. As is well known, the electric control apparatus 40 is constituted by a microcomputer, ROM, RAM, timers, an input interface, an output interface and an electromagnetic valve drive circuit and the electric control apparatus 40 is inputted with signals from the various sensor groups so, for example, an engine rotational speed signal from an engine rotational speed sensor (Ne sensor), a turbine rotational speed signal from a rotational speed sensor (Ni sensor) of the input shaft 201, an output shaft rotational speed signal from a rotational speed sensor (No sensor) of the output shaft 202 and a throttle opening degree signal from a throttle opening degree sensor (θ sensor). Further, in FIG. 2, the O marks related to operational states of the electromagnetic valves indicate a duty ratio of 1.0 and the X marks indicate the duty ratio of 0.0.

FIG. 3 shows a behavior when power on up shift (up shift in the midst of driving a vehicle by engine output) from the forward first speed stage to the forward second speed stage in the vehicular automatic transmission of FIG. 1 is carried out properly.

In FIG. 3, in the forward first speed stage at and before a point in time of issuing the speed shift start instruction (time point t1 of FIG. 3), the released side instruction value (duty ratio provided to electromagnetic valve SOL1) is 0.0, the hydraulic pressure of the first clutch C1 which is the clutch on the released side is at a predetermined maximum value and the first clutch C1 stays in the engaged state. On the other hand, the engaged side instruction value (duty ratio provided to the electromagnetic valve SOL2) is 1.0, the hydraulic pressure of the second clutch which is the clutch on the engaged side is at a minimum value and the clutch C2 stays in the released state.

When the speed shift start instruction is issued, the engaged side instruction value is changed temporarily to 0.0 to increase the engaged side hydraulic pressure (hydraulic pressure provided to the engaged side clutch C2) as swift as possible and after a predetermined constant period has elapsed (time point A in FIG. 3), the engaged side instruction value is changed to an initial value Ci which is set to be able to shift the speed smoothly. On the other hand, the released side instruction value is maintained at 0.0 during a time period in which a release awaiting time period of tr has elapsed from issuance of the speed shift start instruction and when the release awaiting time period tr has elapsed (time point t2 in FIG. 3), the released side instruction value is changed to 1.0 to reduce the released side hydraulic pressure (hydraulic pressure provided to the released side clutch C1) as swift as possible.

Further, when idle run of the piston of the engaged side clutch C2 has been finished and the engaged side hydraulic pressure starts increasing (time point B of FIG. 3), transmission torque is generated at the engaged side clutch C2. Thereafter, the transmission torque of the engaged side clutch C2 is increased in proportion to an increase in the engaged side hydraulic pressure as shown by D of FIG. 3. The rotational speed of the engaged side clutch C2 becomes lower than the rotational speed of the released side clutch C1 by a difference in gear ratios and accordingly, the transmission torque of the engaged side clutch C2 is operated on the reduced speed side, the output shaft torque To of the transmission gear unit is reduced as shown by E in FIG. 3, and a change rate of input shaft rotational speed Ni is reduced as shown by F in FIG. 3. A change rate of the output shaft torque To and a change rate of the input shaft rotational speed Ni are in a proportional relationship. On the other hand, although the released side hydraulic pressure is reduced, the released side clutch C1 is still in the engaged state and no slip is caused. Transmission torque of the released side clutch C1 is reduced by an increase in the transmission torque of the engaged side clutch C2 in accordance with the increase in the transmission torque of the engaged side clutch C2 as shown by G in FIG. 3.

When the transmission torque of the released side clutch C1 becomes null and the released side clutch C1 starts slipping (time point t4 of FIG. 3), the input shaft rotational speed Ni becomes lower than the rotational speed determined by the output shaft rotational speed No and a gear ratio of the forward first speed stage. From when the input shaft rotational speed Ni is detected to be lower than the rotational speed determined by the output shaft rotational speed No and the gear ratio of the forward first speed stage to when the input shaft rotational speed Ni coincides with the rotational speed determined by the output shaft rotational speed No and a gear ratio of the forward second speed stage (time point t5 of FIG. 3), the engaged side instruction value is feed back controlled such that the input shaft rotational speed Ni is reduced while maintaining the change rate of the input shaft rotational speed Ni at a predetermined change rate.

A pattern control is carried out from the time point t1 to the time point t4 of FIG. 3. When the input shaft rotational speed Ni is detected to coincide with the rotational speed determined by the output shaft rotational speed No and the gear ratio of the forward second speed stage, the engaged side instruction value is changed to 0.0, the engaged side hydraulic pressure is increased to a predetermined maximum value and the speed shift is finished.

In FIG. 3, a time period from the point where the transmission torque of the engaged side clutch C2 is generated to the time point where the input shaft rotational speed Ni becomes lower than the output shaft rotational speed No and the gear ratio of the forward first speed stage, is referred to as a torque phase. A time period from the point where the input shaft rotational speed Ni becomes lower than the rotational speed determined by the output shaft rotational speed No and the gear ratio of the forward first speed stage to the point where the input shaft rotational speed Ni coincides with the rotational speed determined by the output shaft rotational speed No and the gear ratio of the forward second speed stage, is referred to as an inertia phase.

In the mass production of constituent elements of the vehicular automatic transmission, a dispersion in a piston idle running distance and a dispersion in properties (correlation between instructed values and hydraulic pressure) of electromagnetic valves provided with control instruction values, are inevitable.

In the case in which the piston idle running distance of the engaged side clutch is shorter than a reference value, when clutch to clutch speed shift is executed at respective reference values of the release awaiting time period tr and the initial value Ci (the reference value of the release awaiting time period tr is adaptable when the piston idle running distance is at its reference value and the reference value of the initial value Ci is adaptable when the property of the electromagnetic valve SOL1 is at its reference property), considerable speed shock is caused. A behavior of speed shift in this case is shown by FIG. 4. In FIG. 4, the bold line indicates a proper case and a dotted line indicates a case in which the speed shift shock is caused. As shown in FIG. 4, at the time point where the piston idle running of the engaged side clutch C2 has been finished, the engaged side hydraulic pressure starts increasing and the transmission torque of the engaged side clutch C2 is generated, thus causing a shift in the hydraulic pressure from point a to point a'. At the time point a', the released side hydraulic pressure does not start reducing and accordingly, the amount of overlapping of the transmission torque of the released side clutch C1 and the transmission torque of the engaged side clutch C2 becomes excessively large and the amount of reduction of the output shaft torque To becomes large as shown by b and considerable speed shift shock is caused.

Further, also in the case in which the property of the electromagnetic valve SOL1 provided with the engaged side instruction value is a property deviated to a side in which the hydraulic pressure relative to the instruction value is increased in view of the reference property, when clutch to clutch speed shift is executed at respective reference values of the release awaiting time period tr and the initial value Ci, considerable speed shift shock is caused. A behavior of the speed shift in this case is shown by FIG. 5. In FIG. 5, the bold line indicates a proper case and the dotted line indicates the case in which the speed shift shock is caused. As shown by FIG. 5, an increase in the engaged side hydraulic pressure after finishing the piston idle running of the engaged side clutch C2 is fast as shown by C and accordingly, the speed of reducing the output shaft torque To becomes fast as shown by d compared with that in the proper case. Further, a reduction in the released side hydraulic pressure cannot follow the increase in the engaged side hydraulic pressure and so the amount of reduction of the output shaft torque To becomes as large as e compared with that in the proper case. Further, even when the operation shifts to the inertia phase, the engaged side hydraulic pressure becomes as high as f compared with that in the proper case and accordingly, a change in the input shaft rotational speed Ni becomes as fast as g compared with that in the proper case. accordingly, the output shaft torque To is rapidly increased as shown by h. In this way, the considerable speed shift shock is caused by rapidly changing the output shaft torque To from the torque phase to the inertia phase.

A state in which engagement of the engaged side clutch C2 is excessively faster than the release of the released side clutch C1 as shown by the dotted lines of FIG. 4 and FIG. 5, is referred to as torque interference (or possibly also referred to as tie up).

Known technology for restraining the above-described torque interference from occurring is described in Japanese Patent Laid-Open No. 341527/1994. According to this known technology, attention is paid to the fact that a time period of the torque phase when speed shift by which the torque interference is caused is carried out becomes longer than a time period of the torque phase when the speed shift is carried out properly in performing clutch to clutch speed shift, a time period T from start of the torque phase to start of the inertia phase in the speed shift operation is detected. When the time period T is longer than a first predetermined time period and shorter than a second predetermined time period, the torque interference is determined to be caused. In clutch to clutch speed shift at the next time, the instruction values are corrected by predetermined amounts such that overlapping of torques allocated to a frictional engaging element on a released side and a frictional engaging element on an engaged side is released, further, when the time period T is longer than the second predetermined time period, strong torque interference is determined to be caused and the hydraulic instruction values are corrected at once such that an increase in transmission torque of the frictional engaging element on the engaged side is restrained. The timing for starting the torque phase is detected by a slight reduction in a differential value of an output shaft rotational speed in a transmission gear unit. Further, the timing of starting the inertia phase is detected by a change in a turbine rotational speed (input shaft rotational speed).

In FIG. 4, the time period T of the torque phase in carrying out speed shift by which torque interference is caused, becomes longer than a time period t of the torque phase when proper speed shift is carried out. Accordingly, when the torque interference is determined by using the method of determining the torque interference described in the publication and the torque interference is determined, the torque interference can be restrained by correcting the engaged side instruction value to a side where the hydraulic pressure is reduced in clutch to clutch speed shift the next time.

In this case, it is important to precisely detect the timing of starting the torque phase. However, according to the detection method in which the torque phase is determined to start by a slight reduction in the differential value of the output shaft rotational speed (change rate of output shaft rotational speed) as described in the publication, it is difficult to precisely detect the timing of starting the torque phase. That is, a differential value of the rotational speed of an output shaft or a turbine in power on up shift, includes also an acceleration component of a vehicle and it is realistically difficult to detect the slight change accompanied by the start of the torque phase.

Further, in FIG. 5, the time period T of the torque phase when speed shift is carried out such that torque interference is caused, becomes shorter than the time period t of the torque phase when proper speed shift is carried out. Therefore, according to the method of determining the torque interference described in the publication, the occurrence of the torque interference cannot be determined.

Therefore, according to the technology described in the aforementioned publication, speed shift shock caused by torque interference in the clutch to clutch speed shift cannot be relatively precisely restrained.

A need thus exists for a detection method capable of relatively precisely detecting the timing of the start of the torque phase in clutch to clutch speed shift.

A need also exists for a speed shift control apparatus of a vehicular automatic transmission that is capable of relatively precisely restraining speed shift shock caused by torque interference in clutch to clutch speed shift.

It would also be desirable to provide a detection method capable of relatively precisely detecting the torque interference intensity in clutch to clutch speed shift.

Further a need exists for a speed shift control apparatus of a vehicular automatic transmission capable of relatively precisely restraining speed shift shock caused by torque interference in clutch to clutch speed shift.

SUMMARY OF THE INVENTION

A first aspect of the invention involves a method of detecting the start of a torque phase in clutch to clutch speed shift of a vehicular automatic transmission for simultaneously carrying out engagement and release of two frictional engaging elements provided at a reduction gear unit for switching speed stages of the reduction gear unit of the vehicular automatic transmission by connecting the turbine runner of a torque converter and the input shaft of the reduction gear unit to integrally rotate. The method involves detecting the rotational speed of either the input shaft or the output shaft of the reduction gear unit in the clutch to clutch speed shift, separating and extracting from the detected rotational speed a change component at a predetermined frequency or higher accompanied by generation of a transmission torque of an engaged side of the frictional engaging elements, and determining the start of the torque phase based on the reduction amount of the extracted change component.

According to a second aspect of the invention, a speed shift control apparatus of a vehicular automatic transmission for executing clutch to clutch speed shift for simultaneously carrying out engagement and release of two frictional engaging elements provided to a reduction gear unit for switching speed stages of the reduction gear unit of the vehicular automatic transmission by connecting the turbine runner of a torque converter and the input shaft of the gear reduction unit to integrally rotate. The speed shift control apparatus includes a hydraulic pressure controlling device for controlling the engagement and the release of the two frictional engaging elements, an instructing device for instructing the engagement and the release of the two frictional engaging elements to the hydraulic pressure controlling device in response to a speed shift start instruction, and a device for detecting the rotational speed of either the input shaft or the output shaft of the reduction gear unit in the clutch to clutch speed shift, for separating and extracting from the detected rotational speed a change component at a predetermined frequency or higher accompanied by generation of a transmission torque of an engaged side of the frictional engaging elements, and for determining start of a torque phase from the amount of reduction of the extracted change component. A time interval detector detects a time period from start of release of a released side of the frictional engaging elements to start of the torque phase detected by the detecting device in operating the clutch to clutch speed shift. The instructing device corrects a release awaiting time period from issuance of the speed shift start instruction to start of the release of the released side of the frictional engaging elements in the clutch to clutch speed shift at a succeeding time such that a way of overlapping torques allocated to the released side frictional engaging element and the engaged side frictional engaging element is ideally approximated based on the time period detected by the time period detecting device.

A third aspect of the invention involves a method of detecting the start of a torque phase in clutch to clutch speed shift of a vehicular automatic transmission for simultaneously carrying out engagement and release of two frictional engaging elements provided to a reduction gear unit for switching speed stages of the reduction gear unit of the vehicular automatic transmission by connecting a turbine runner of a torque converter and an input shaft of the reduction gear unit to integrally rotate, wherein the rotational speed of either the input shaft or the output shaft of the reduction gear unit in the clutch to clutch speed shift is detected, and a change component accompanied by generation of a transmission torque of an engaged side of the frictional engaging elements is separated and extracted from the detected rotational speed at a predetermined frequency or higher. The torque interference intensity is then determined based on a rate of reducing the extracted change component.

In accordance with a fourth aspect of the invention, a speed shift control apparatus of a vehicular automatic transmission executes clutch to clutch speed shift for simultaneously carrying out engagement and release of two frictional engaging elements provided to a reduction gear unit for switching speed stages of the reduction gear unit of the vehicular automatic transmission by connecting the turbine runner of a torque converter and the input shaft of the gear reduction unit to integrally rotate. The speed shift control apparatus includes hydraulic pressure controlling means for controlling the engagement and the release of the two frictional engaging elements, instructing means for instructing the engagement and the release of the two frictional engaging elements to the hydraulic pressure controlling means in response to a speed shift start instruction, and detecting means for detecting a rotational speed of either of the input shaft and an output shaft of the reduction gear unit in the clutch to clutch speed shift, separating and extracting a change component at a predetermined frequency or higher accompanied by generation of a transmission torque of an engaged side of the frictional engaging elements from the detected rotational speed, and determining start of a torque interference intensity from an amount of reducing the extracted change component, wherein the instructing means is constituted to correct an initial value of an instruction value related to a hydraulic pressure of the engaged side of the frictional engaging elements in the clutch to clutch speed shift at a succeeding time such that a way of overlapping torques allocated to a released side of the frictional engaging elements and the engaged side of the frictional engaging elements are ideally approximated based on a torque interference intensity detected by the detecting means.

The inventors herein have considered whether only a component accompanied by a change in the transmission torque of the engaged side clutch can be taken out by classifying a behavior of a change rate DNi of the input shaft rotational speed in the torque phase in power on up shift by the clutch to clutch speed shift as a frequency component of a change in the input shaft rotational speed Ni (change is fast: frequency is high, change is slow: frequency is low) and have carried out a time-sequential frequency analysis using a frequency analyzing method to which wavelet transformation is applied in respect of the change in the input shaft rotational speed Ni during power on up shift from forward first speed stage to forward second speed stage by clutch to clutch speed shift at various throttle opening degrees. Based on this analysis, the following has been discovered.

(1) A peak appears at a specific frequency of a frequency distribution at a timing the same as that of causing the change of the change rate DNi of the input shaft rotational speed accompanied by generation of the transmission torque of the engaged side clutch.

(2) The larger the change rate DNi of the input shaft rotational speed, the higher the frequency at which the peak appears and the peak is distributed in a range of about 1 through 6 Hz even with the speed shift at the respective throttle opening degrees.

Meanwhile, when an output from the input shaft rotational speed sensor (Ni sensor) is made to pass a secondary Butterworth high pass filter having a cutoff frequency of 1.0 Hz which is a digital filter, it has been found that almost all of the acceleration component of the vehicle is removed from the change in the input shaft rotational speed Ni.

Thereby, by passing the output from the Ni sensor through the digital filter, only the change in the input shaft rotational speed Ni caused by reducing the change rate DNi of the input shaft rotational speed accompanied by generation of the transmission torque of the engaged side clutch is extracted, and accordingly the start of the torque can be detected therefrom.

Further, by utilizing the fact that in the torque phase, a change rate of the output shaft torque To and the change rate of the input shaft rotational speed Ni are in a proportional relationship (refer to FIG. 3), from the feature of the change in the filter output, it is possible to detect how the output shaft torque is changed in accordance with generation of the transmission torque of the engaged side clutch (torque interference intensity=large or small of a level of drawing shock in torque interference).

FIG. 6 shows changes in an engaged side instruction value, a released side instruction value, an engaged side hydraulic pressure and a released side hydraulic pressure, changes in the input shaft rotational speed Ni and forward and rearward acceleration G of a vehicle accompanied thereby, and changes in the change rate DNi of the input shaft rotational speed and a filter output value Ni_fil of the digital filter inputted with the input shaft rotational speed Ni in carrying out power on up shift from the forward first speed stage to the forward second speed stage by the clutch to clutch speed shift at the throttle opening degree of 15%. Further, FIG. 7 shows the changes in the engaged side instruction value, the released side instruction value, the engaged side hydraulic pressure and the released side hydraulic pressure, the changes in the input shaft rotational speed Ni and the forward and rearward acceleration G of the vehicle accompanied thereby, and the changes in the change rate DNi of the input shaft rotational speed and the filter output value Ni_fil in carrying out power on up shift from the forward first speed stage to the forward second speed stage by the clutch to clutch speed, shift at the throttle opening degree of 50%.

As shown in FIG. 6 and FIG. 7, the timing at which the filter output value Ni_fil and the change rate DNi of the input shaft rotational speed fall, is substantially in synchronism with the rise of the engaged side hydraulic pressure and the fall of the forward and rearward acceleration G of the vehicle (corresponding to the change in the output shaft torque To), which indicates that the change in the transmission torque of the engaged side clutch appears as the change in the input shaft rotational speed Ni (the filter output value Ni_fil and the change rate DNi of the input shaft rotational speed). That is, by utilizing the feature that when the transmission torque of the engaged side clutch is generated at the torque phase, the change rate DNi of the input shaft rotational speed is reduced, the transmission torque of the engaged side clutch can be determined from the change in the input shaft rotational speed Ni in the torque phase (fall of the filter output value Ni_fil and the change rate DNi of the input shaft rotational speed).

Further, as shown by FIG. 6 and FIG. 7, the larger the change rate of the filter output value Ni_fil and the change rate DNi of the input shaft rotational speed in the torque phase, the more rapid is the degree of reducing the forward and rearward acceleration G of the vehicle in the torque phase, which indicates that the torque interference intensity can be determined from the change rate of the filter output value Ni_fil and the change rate DNi of the input shaft rotational speed.

In this case, observing a difference between the filter output value Ni_fil and the change rate DNi of the input shaft rotational speed, as apparent from FIG. 6 and FIG. 7, the amount of change in the torque phase is larger in the filter output value Ni_fil than in the change rate DNi of the input shaft rotational speed and the change in the torque phase is easy to catch in the filter output value Ni_fil. Because the change rate DNi of the input shaft rotational speed is a difference of the input shaft rotational speed Ni at each sampling and accordingly, although a direct current component thereof is nullified, other change components accompanied by the acceleration and the change in the throttle opening degree are all outputted as change amounts and therefore, the changes are difficult to catch. On the other hand, according to the filter output value Ni_fil, by the effect of the digital filter (cutoff frequency: 1.0 Hz), the gradual changes in the input shaft rotational speed which are components at 1.0 Hz or less are removed and are almost nullified during acceleration at the forward first speed stage. Further, after entering the torque phase, a component at 1.0 Hz or higher, that is the change in the input shaft rotational speed accompanied by generation of the transmission torque of the engaged side clutch is mainly outputted and therefore the capacity of detecting the transmission torque of the engaged side clutch becomes higher in the engaged side clutch during the torque phase than in the change rate DNi of the input shaft rotational speed.

In the torque phase, the input shaft and the output shaft are brought into a cooperatively moving relationship by the gear ratio of the forward first speed stage and therefore, a similar result is obtained even when a filter output value Ni-fil is provided from the output shaft rotational speed No in place of providing the filter output value Ni_fil from the input shaft rotational speed Ni.

Therefore, the method of detecting the start of the torque phase in accordance with the first aspect of the present invention, compared with a case in which the start of the torque phase is detected from the change rate DNi of the output rotational speed or the change rate DNo of the input shaft rotational speed change rate, the start of the torque phase can relatively precisely be detected. Further, according to the method of detecting the torque interference intensity of the present invention, even in the case where the time period T of the torque phase when speed shift in which the torque interference is caused is carried out, is shorter than the time period t of the torque phase when proper speed shift is carried out as shown by FIG. 5, the torque interference intensity can be detected relatively precisely.

With the speed shift control apparatus of the vehicular automatic transmission in accordance with the second aspect of the present invention, the start of the torque phase is relatively precisely detected by using the detection method of the present invention, the time period from the start of releasing the frictional engaging element on the released side to the start of the torque phase in the speed shift operation is detected, based on the detected time period, the release awaiting time period from the speed shift start instruction to start of releasing the frictional engaging element on the released side in the clutch to clutch speed shift at the succeeding time, is corrected such that the way of overlapping the torques allocated to the frictional engaging element on the released side and the frictional engaging element on the engaged side is ideally approximated. Therefore, speed shift shock caused by the torque interference in the clutch to clutch speed shift can be relatively precisely controlled.

In the vehicular automatic transmission speed shift control apparatus according to the fourth aspect of the present invention, the torque interference intensity is relatively precisely detected by using the detection method according to the second aspect of the present invention, based on the detected torque interference intensity, the initial value of the instruction value related to the hydraulic pressure of the frictional engaging element on the engaged side in the clutch to clutch speed shift at the succeeding time is corrected such that the way of overlapping the torques allocated to the frictional engaging element on the released side and the engaged side frictional engaging element is ideally approximated. Accordingly, the speed shift shock caused by the torque interference in the clutch to clutch speed shift can be relatively precisely restrained.

Further, the speed shift control apparatus of the vehicular automatic transmission according to the fourth aspect of the present invention may be further provided with detecting means for detecting that the torque interference intensity exceeds its limit and the instructing means may be constituted such that in response to the detection that the torque interference intensity exceeds its limit, the instruction to the hydraulic pressure controlling means in the clutch to clutch speed shift at a current time is corrected to restrain an increase in the transmission torque of the engaged side frictional engaging element. As a result, speed shift shock caused by torque interference in the clutch to clutch speed shift can be relatively precisely restrained.

The method of detecting the start of the torque phase according to the first aspect of the present invention is applicable as a method of detecting start of a torque phase of a speed shift control apparatus other than the speed shift control apparatus according to the second aspect of the invention. One example is the speed shift control apparatus described in Japanese Patent Laid-Open No. 341527/1994. Further, the method of detecting the torque interference intensity according to the third aspect of the invention is applicable to a method of detecting torque interference intensity of a speed shift control apparatus other than the speed shift control apparatus according to the fourth aspect of the invention. An example is the speed shift control apparatus described in Japanese Patent Laid-Open No. 341527/1994.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein:

FIG. 2 is a diagram showing a relationship between respective clutches, respective brakes and respective electromagnetic valves and speed stages;

DETAILED DESCRIPTION OF THE INVENTION

Figure 1:
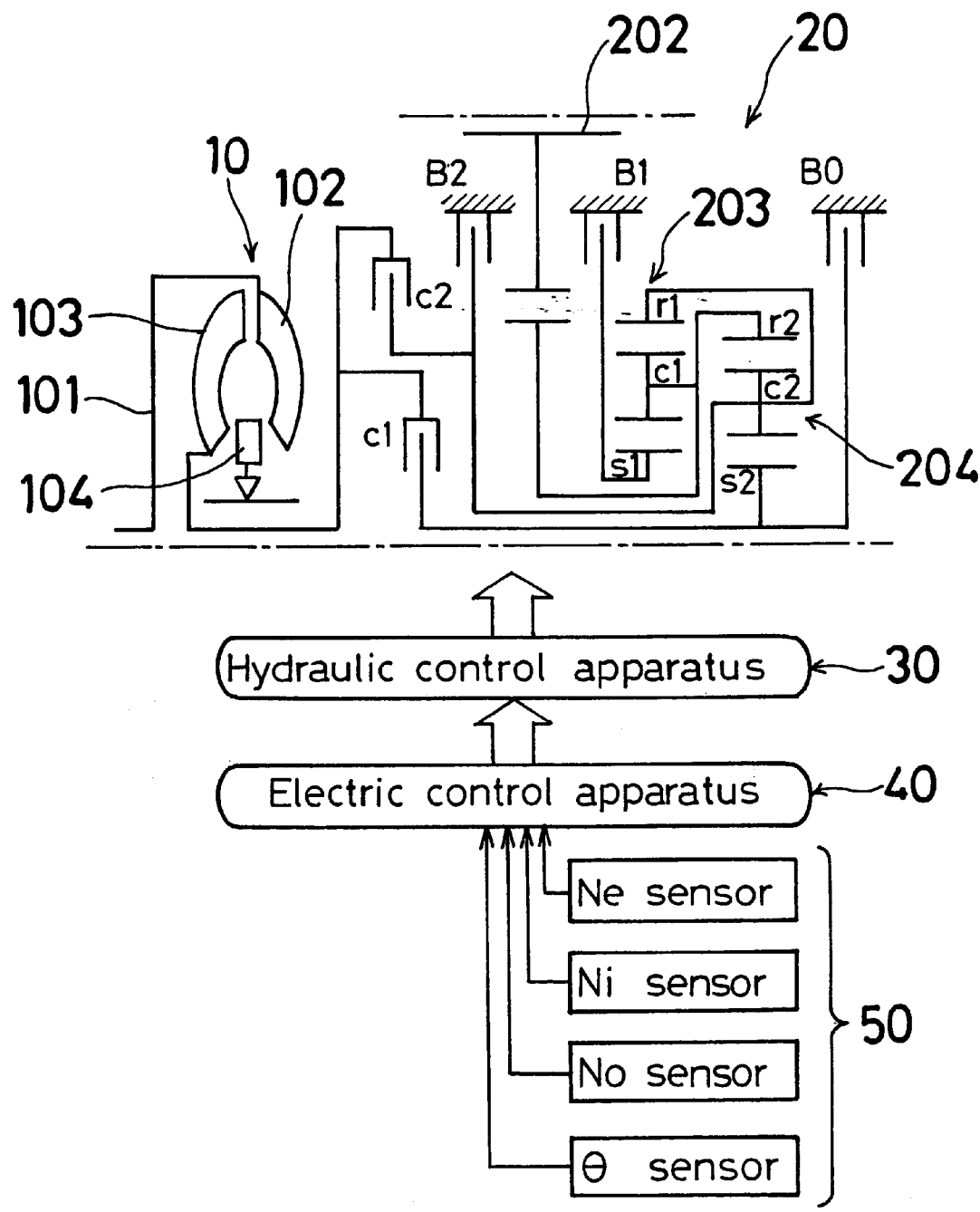
FIG. 1 is a schematic illustration of a vehicular automatic transmission to which the present invention is applied.
Figure 8:
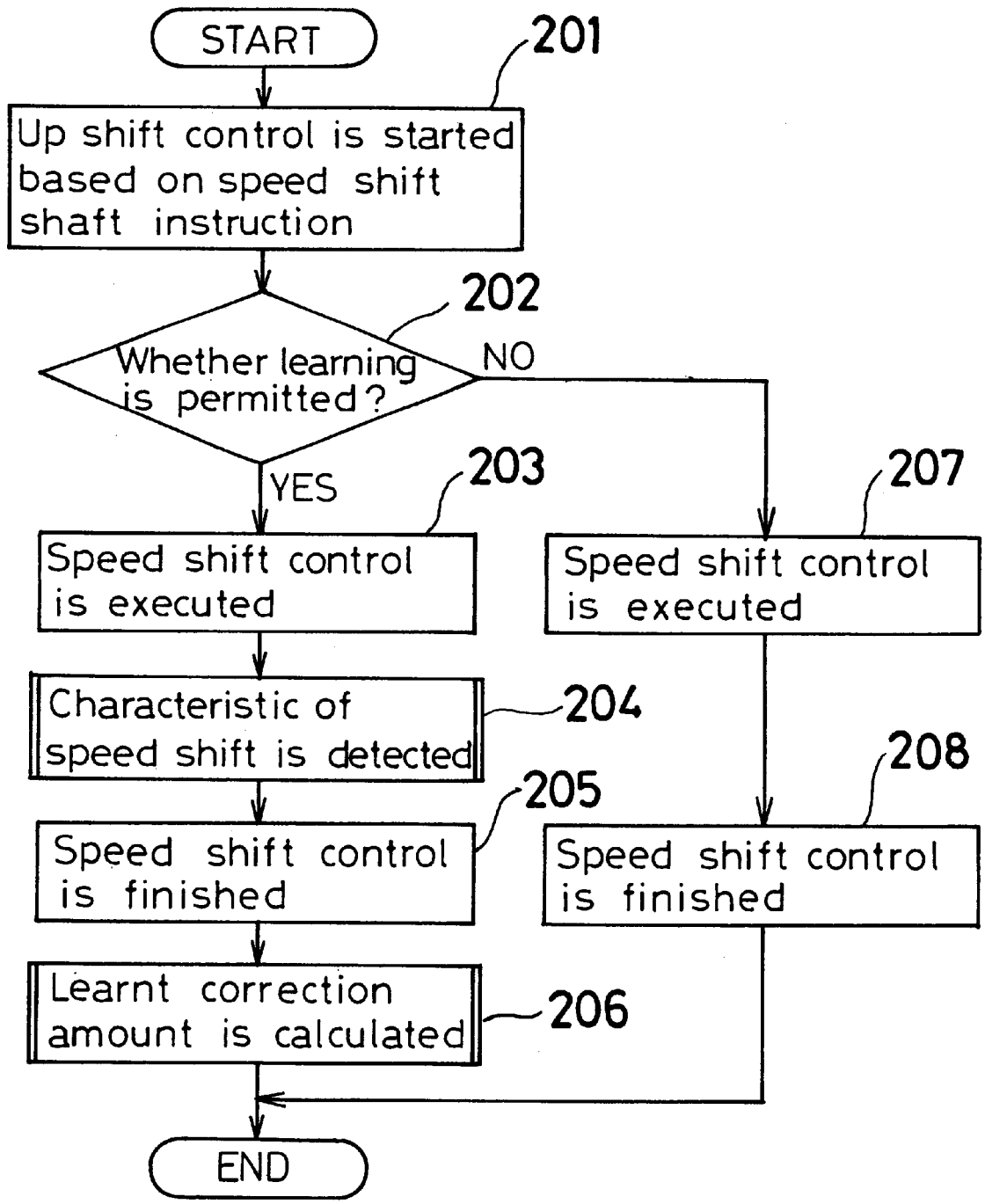
FIG. 8 is a flowchart showing a processing procedure of speed shift control of the 1–2 power on up shift.

Referring to FIGS. 8–15, an explanation will be given of an embodiment embodying the present invention. The flowchart of FIG. 8 shows a flowchart associated with the learning control with regard to a release awaiting time period tr of a released side instruction value and an initial value Ci of an engaged side instruction value in power on up shift from the forward first speed stage to the forward second speed stage. The control is executed by a microcomputer in the electric control apparatus 40 shown in FIG. 1 and is executed at every operation period of a main routine of the microcomputer. Control programs of the microcomputer are mounted with a control program which functions as a secondary Butterworth high pass filter having a cutoff frequency of 1.0 Hz.

Figure 3:
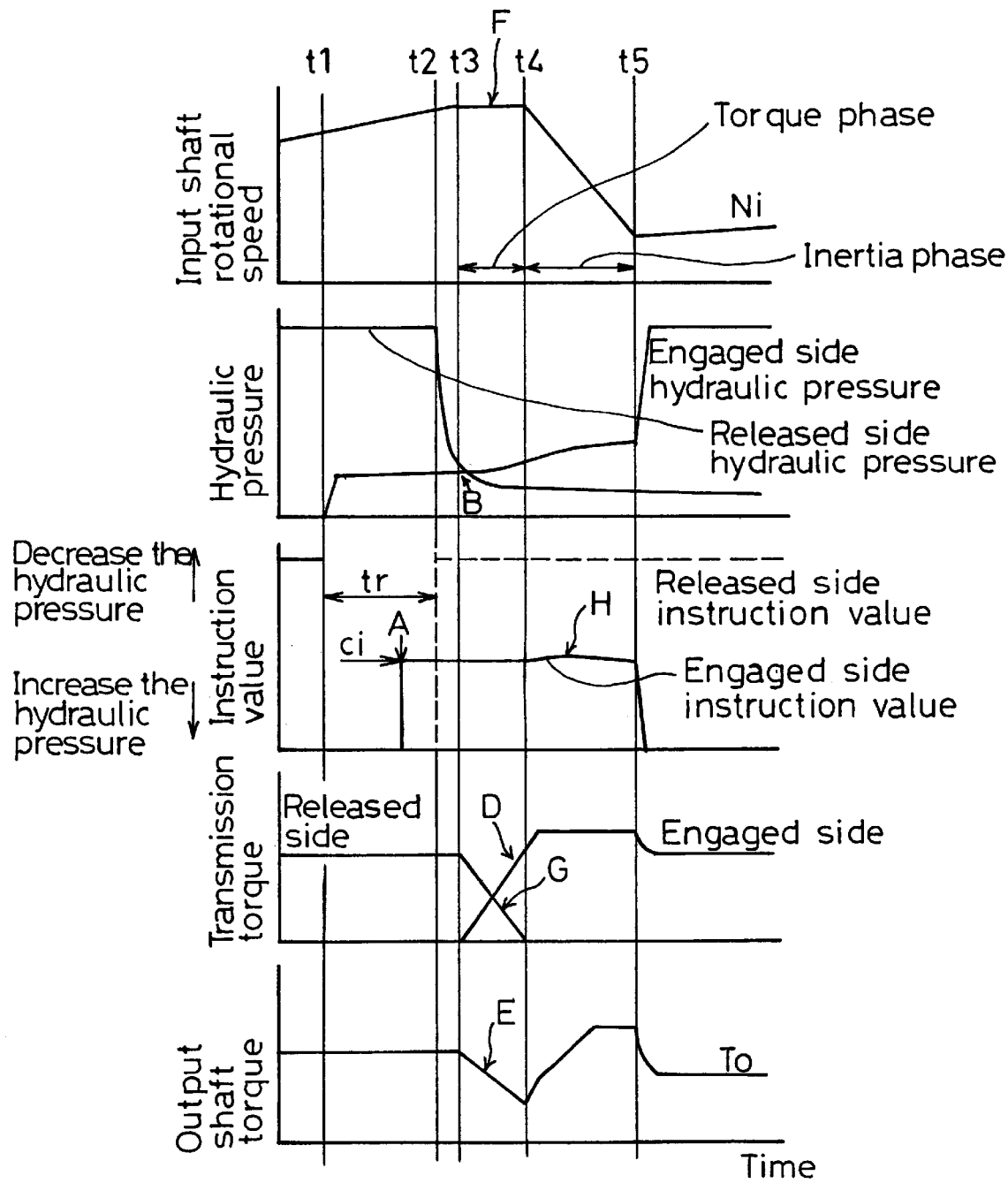
FIG. 3 illustrates time charts showing a behavior of proper 1-2 power on up shift.
Figure 4:
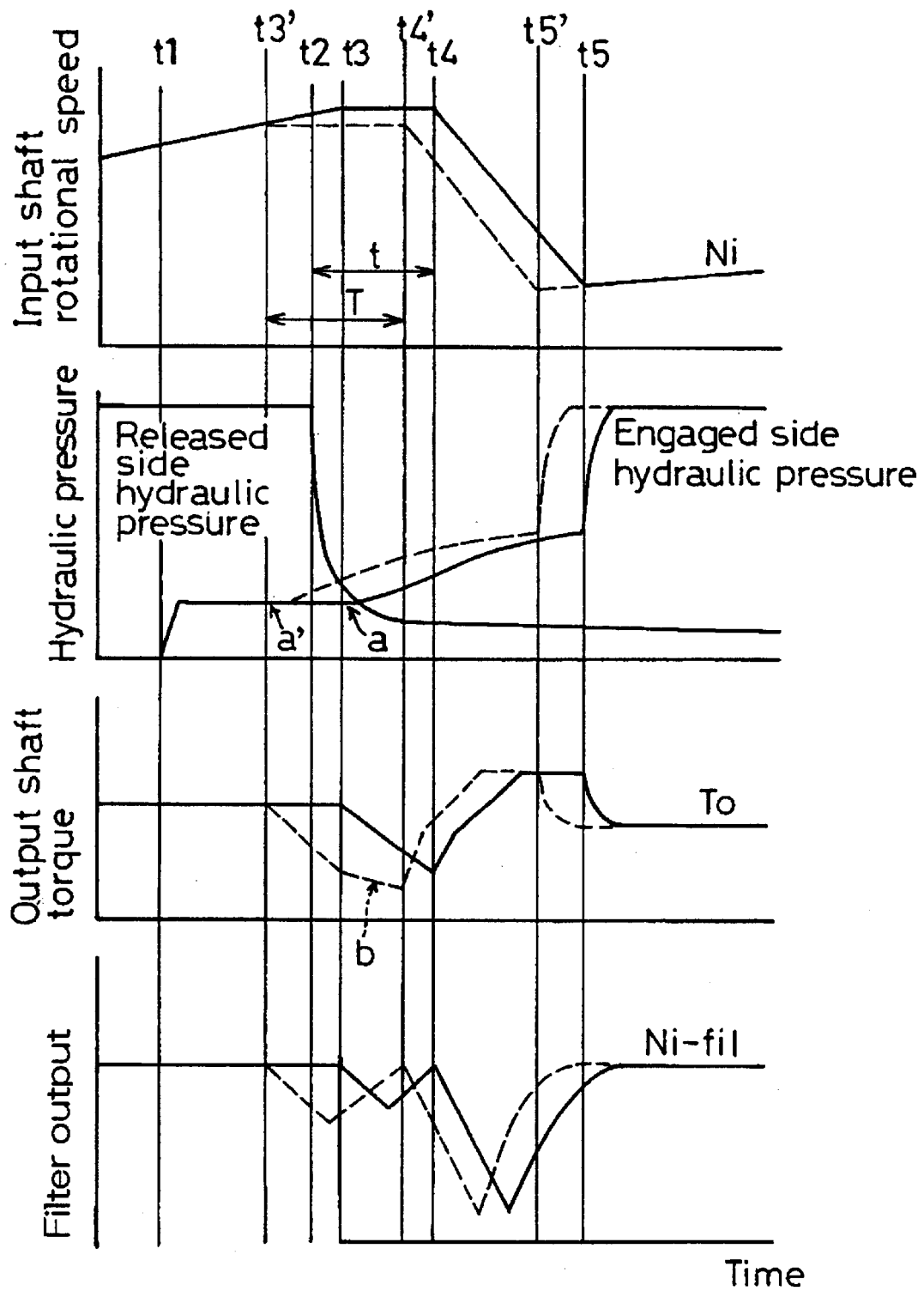
FIG. 4 illustrates time charts showing an improper behavior of the 1–2 power on up shift.
Figure 5:
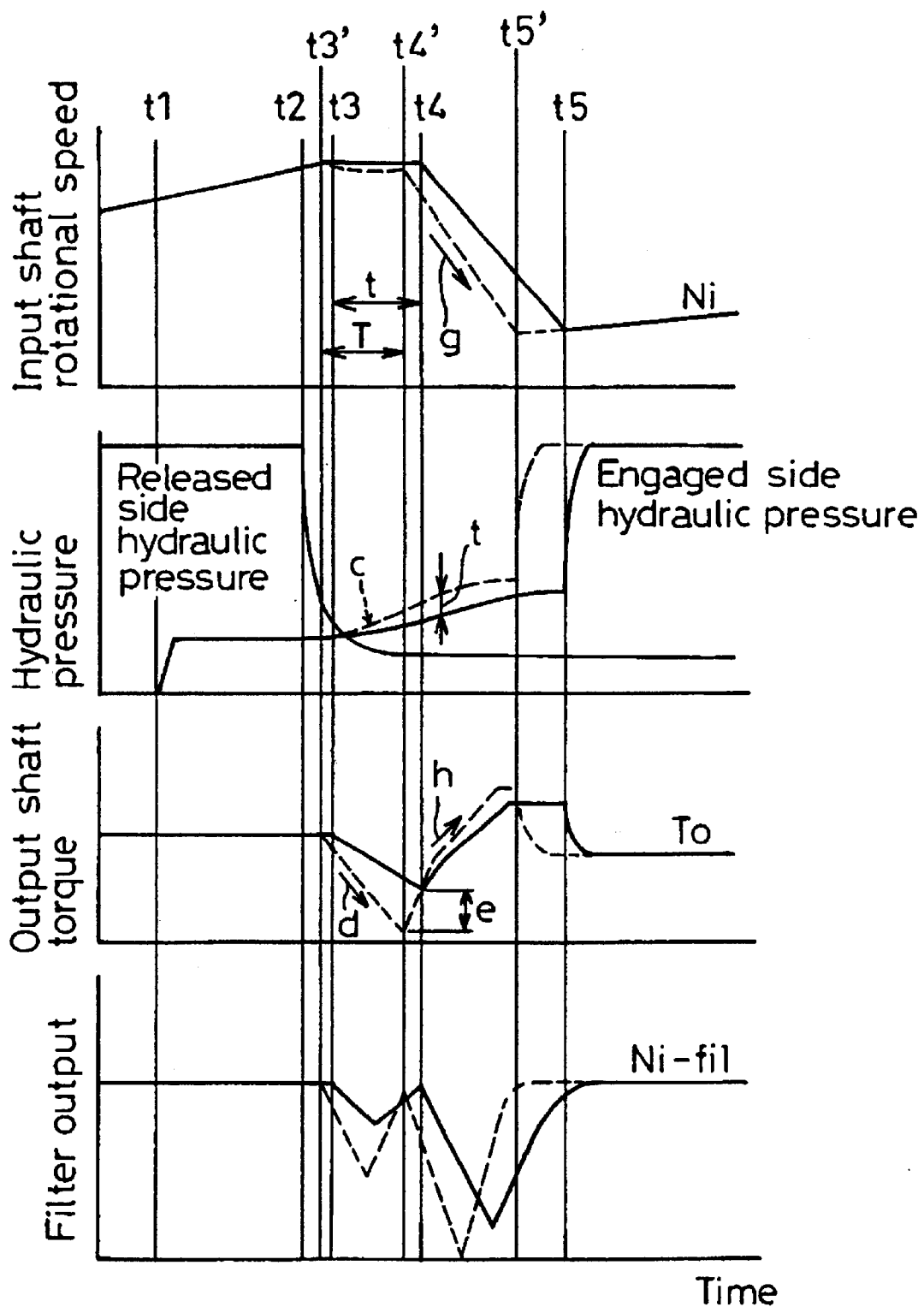
FIG. 5 illustrates time charts showing a behavior of improper speed shift different from that in FIG. 4.
Figure 6:
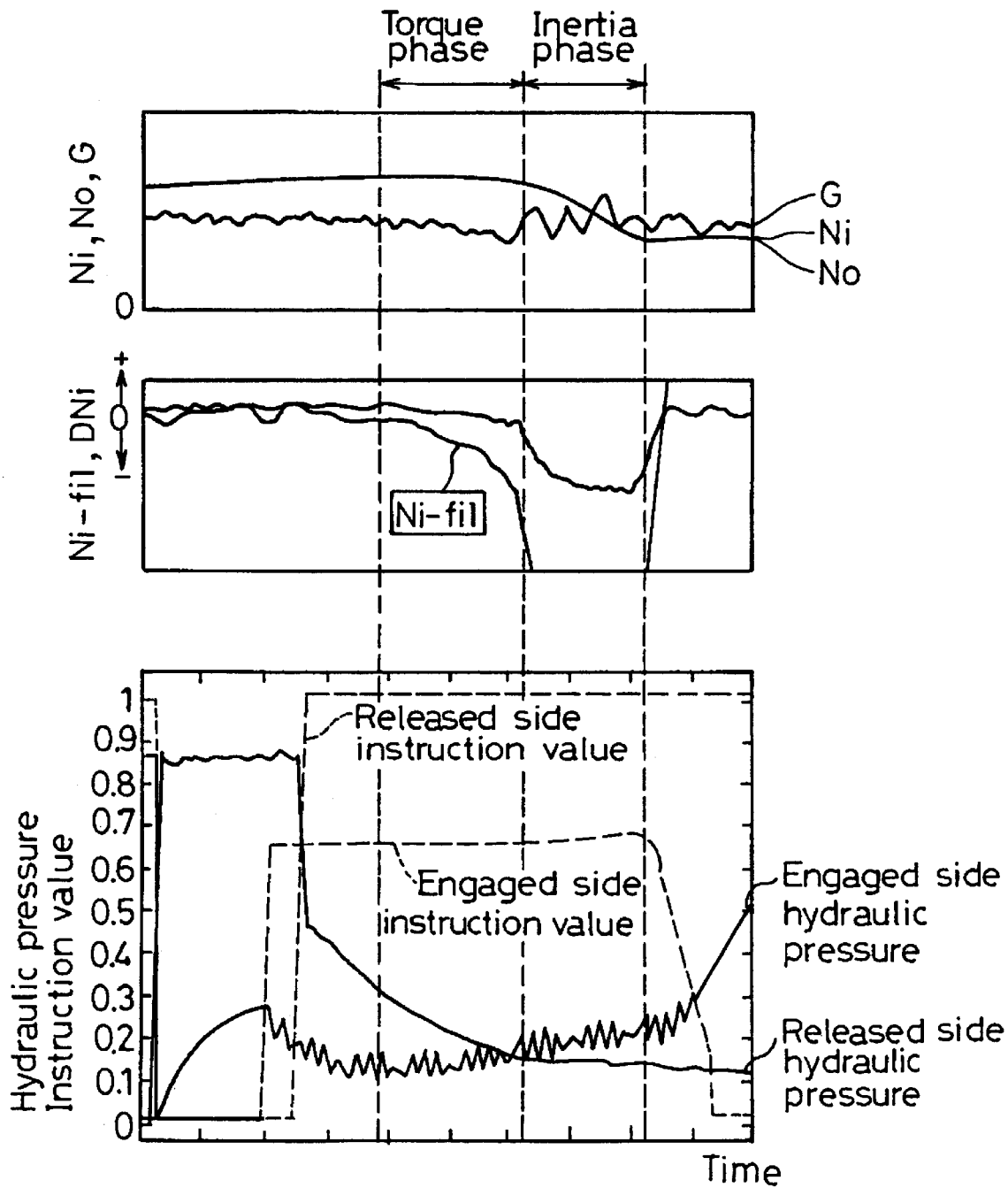
FIG. 6 illustrates time charts showing a behavior of speed shift of the 1–2 power on up shift at a throttle opening degree of 15%.
Figure 7:
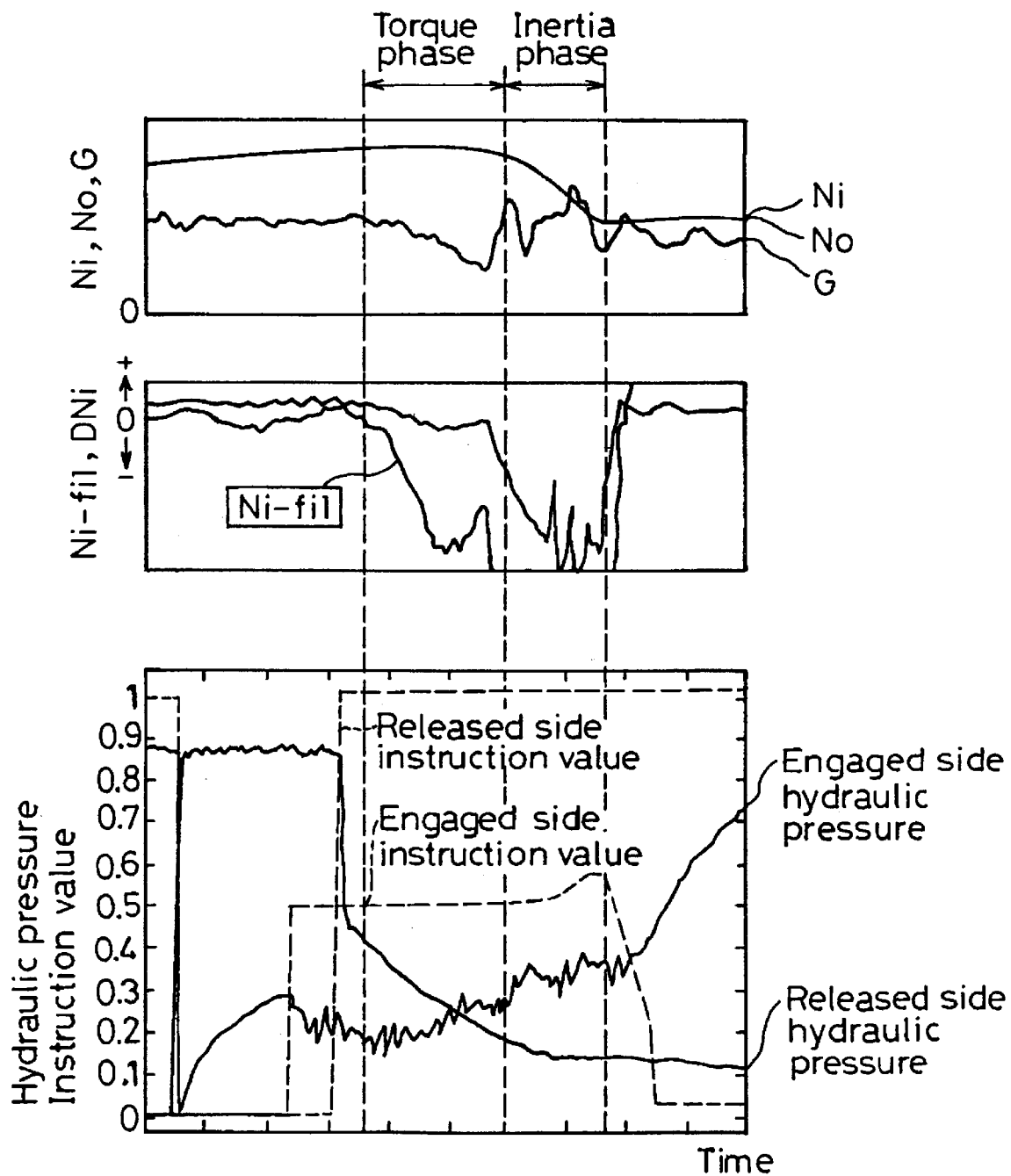
FIG. 7 illustrates time charts showing a behavior of speed shift of the 1–2 power on up shift at a throttle opening degree of 50%.

According to the learning control as shown in FIG. 8, at step 201 the up shift control is started based on speed shift start instruction. Then, at step 202 it is determined whether learning is permitted and the operation proceeds to step 203 when learning control is permitted. At step 203, the speed shift control is executed by controlling the engaged side instruction value and the released side instruction value by pattern control and feedback control as shown in FIG. 3, by using the release awaiting time period tr constituted by adding a correction amount $\Delta tr$ based on characteristic detection of speed shift in up shift control at a preceding time to a reference value tr0 of a release awaiting time period with regard to the released side instruction value. An initial value Ci constituted by adding a correction value $\Delta Ci$ calculated based on the characteristic detection of speed shift in the up shift control at the preceding time to a reference value Ci0 of an initial value with regard to the engaged side instruction value. Thereafter, at step 204, the characteristic of the speed shift is detected from a filter output value Ni_fil during the speed shift. The speed shift control is finished at step 205 and thereafter, a learned correction amount is calculated at step 206. When learning is not permitted by a determination result at step 202, speed shift control similar to that in step 203 is carried out at step 207, successively, with the speed shift control being finished at step 208.

Figure 9:
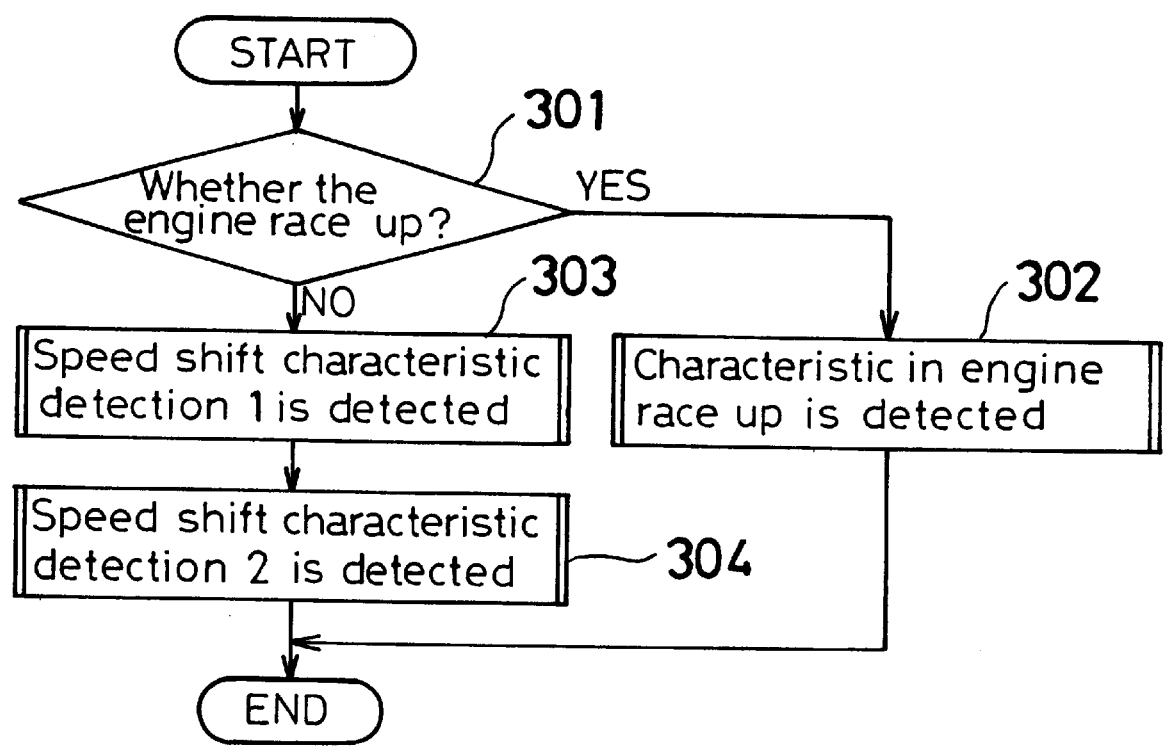
FIG. 9 is a flowchart showing the details of the processing control of step 204 in FIG. 8.

According to detection of the characteristic of speed shift at step 204 in FIG. 8, improper speed shift is detected from the filter output value Ni_fil during the speed shift, and characteristic amounts constituting calculation references of the correction value $\Delta tr$ and the correction value $\Delta Ci$ which are used in power on up shift from the forward first speed stage to the forward second speed stage at a succeeding time are calculated and details of processing content of step 204 are shown by the flowchart of FIG. 9.

Improper speed shift includes "E/G race up" in which the input shaft rotational speed Ni exceeds a value in correspondence with the output shaft rotational speed No (output shaft rotational speed gear ratio of forward first speed stage) since the released side clutch is released in a state where the transmission torque of the engaged side clutch is insufficient other than torque interference which the invention intends to restrain. Therefore, according to the flowchart of FIG. 9, at step 301 it is first determined whether the engine race up (E/G race up) of the vehicle is caused based on the input shaft rotational speed Ni and the output shaft rotational speed No. When the determination is YES, the operation proceeds to step 302 and a characteristic in E/G race up is detected. Restraining the E/G race up is not a specific aspect of the invention and so a detailed explanation of such restraining will be omitted.

When the E/G race up is not caused as a result of the determination at step 301, the operation proceeds to step 303 and a time period T (A) from start of release (time point at which release awaiting time period tr has elapsed) to the start of the torque phase, is detected as speed shift characteristic detection 1. Then at step 304 the torque interference intensity is detected as speed shift characteristic detection 2.

Figure 10:
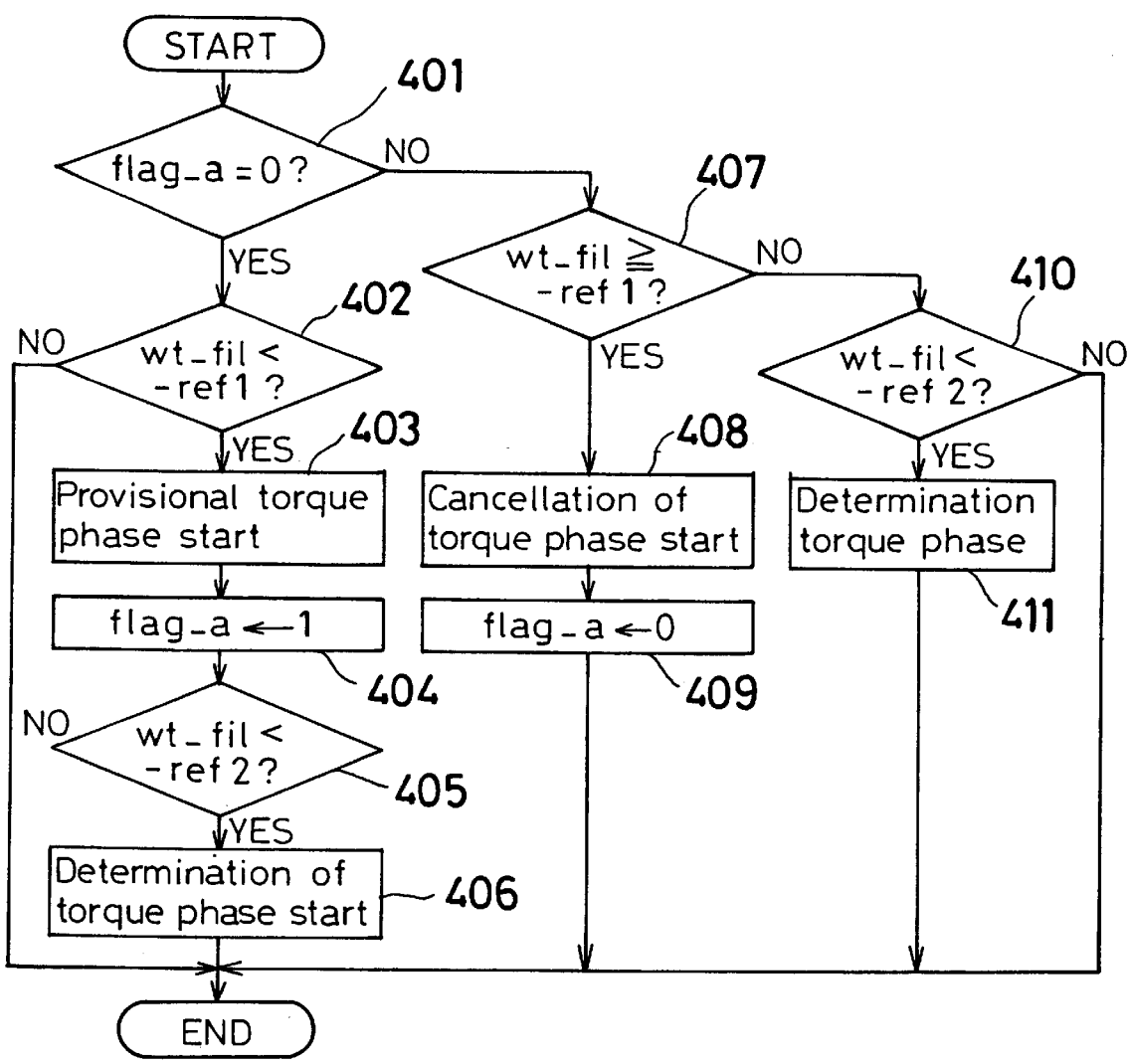
FIG. 10 is a flowchart showing the details of the processing control of step 303 in FIG. 9.
Figure 12:
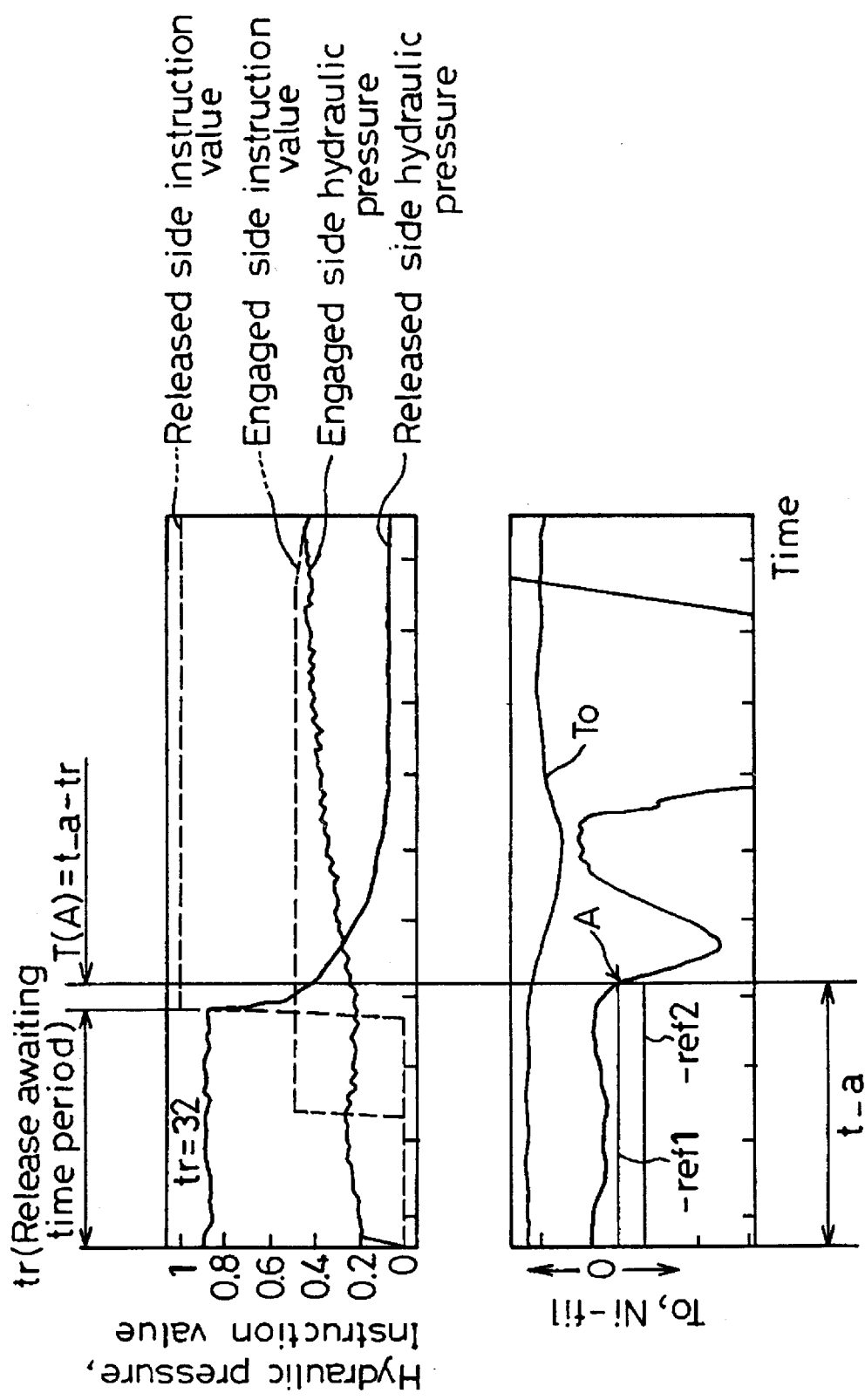
FIG. 12 illustrates time charts showing the behavior of characteristic detection of speed shift.

An explanation will be given of the speed shift characteristic detection 1 at step 403 in reference to the flowchart of FIG. 10 showing details of the processing control of step 303 and FIG. 12 showing changes of the engaged side instruction value, the released side instruction value, the engaged side hydraulic pressure, the released side hydraulic pressure and the filter output value Ni_fil. According to the speed shift characteristic detection 1, start of the torque phase is detected based on a reduction amount (change amount to minus side) of the filter output value Ni_fil during the speed shift and the time period T (A) from start of release to start of torque phase is calculated.

As shown in FIG. 10, at step 401, it is determined whether a flag of flag_a is 0.0 for the flag of flag_a signifies that the start of torque phase is not detected and 1 for the flag of flag_a signifies that the start of torque phase is detected. When the start of the torque phase is not detected as a result of determination at step 401, the operation proceeds to step 402, where it is determined whether the filter output value Ni_fil is less than a first threshold value of −ref1 shown by FIG. 12 by a declining input shaft rotational speed Ni. A the point in time where the filter output value Ni_fil becomes less than the first threshold value −ref1, this is defined as the "provisional torque phase start". At step 403, a time period t_a from start of speed shift to the "provisional torque phase start" is stored and the filter output value Ni_fil is stored as v_a. Thereafter, the flag of flag_a is set to 1 at step 404. The operation then proceeds to step 405 and it is determined whether the filter output value Ni_fil is less than a second threshold value of −ref2. As shown in FIG. 12, the second threshold value of −ref2 is smaller than the first threshold value of −ref1. When the determination in step S405 is YES, "determination of torque phase start" is constituted and a time period T(A)=t_a-tr from the start of release to the start of torque phase is calculated at step 406.

When it is determined at step 402 that the filter output value Ni_fil is not less than the first threshold value of −ref1, the processing of steps 403, 404, 406 is not carried out. Further, when it is determined at step 405 that the filter output value Ni_fil is not less than the second threshold value of −ref2, processing of step 406 is not carried out.

Further, when the start of the torque phase has already been detected as a result of the determination at step 401, the operation proceeds to step 407 and it is determined whether the filter output value Ni_fil is equal to or larger than the first threshold value of −ref1. When the determination is YES, "cancellation of torque phase start" is constituted, the value t_a and the value v_a are respectively reset to 0 at step 408, and the flag of flag_a is reset to 0 at step 409.

Further, when the filter output value Ni_fil is not equal to or less than the first threshold value of −ref1 as a result of the determination at step 407, the operation proceeds to step 410 and it is determined whether the filter output value Ni_fil is less than the second threshold value of −ref2. When the determination is YES, the time period r (A) is calculated at step 411 similar to step 406.

In sum, according to the speed shift characteristic detection 1, the filter output value Ni_fil is observed at every operation period from the start of speed shift. Only in the case in which after the filter output value Ni_fil is reduced to less than the first threshold value of −ref1, the filter output value Ni_fil is not recovered to be equal to or larger than the first threshold value of −ref1 and is reduced to less than the second threshold value of −ref2, the torque phase is determined to start, the flag of flag_a is set to 1, and the time period T(A) is calculated.

Figure 11:
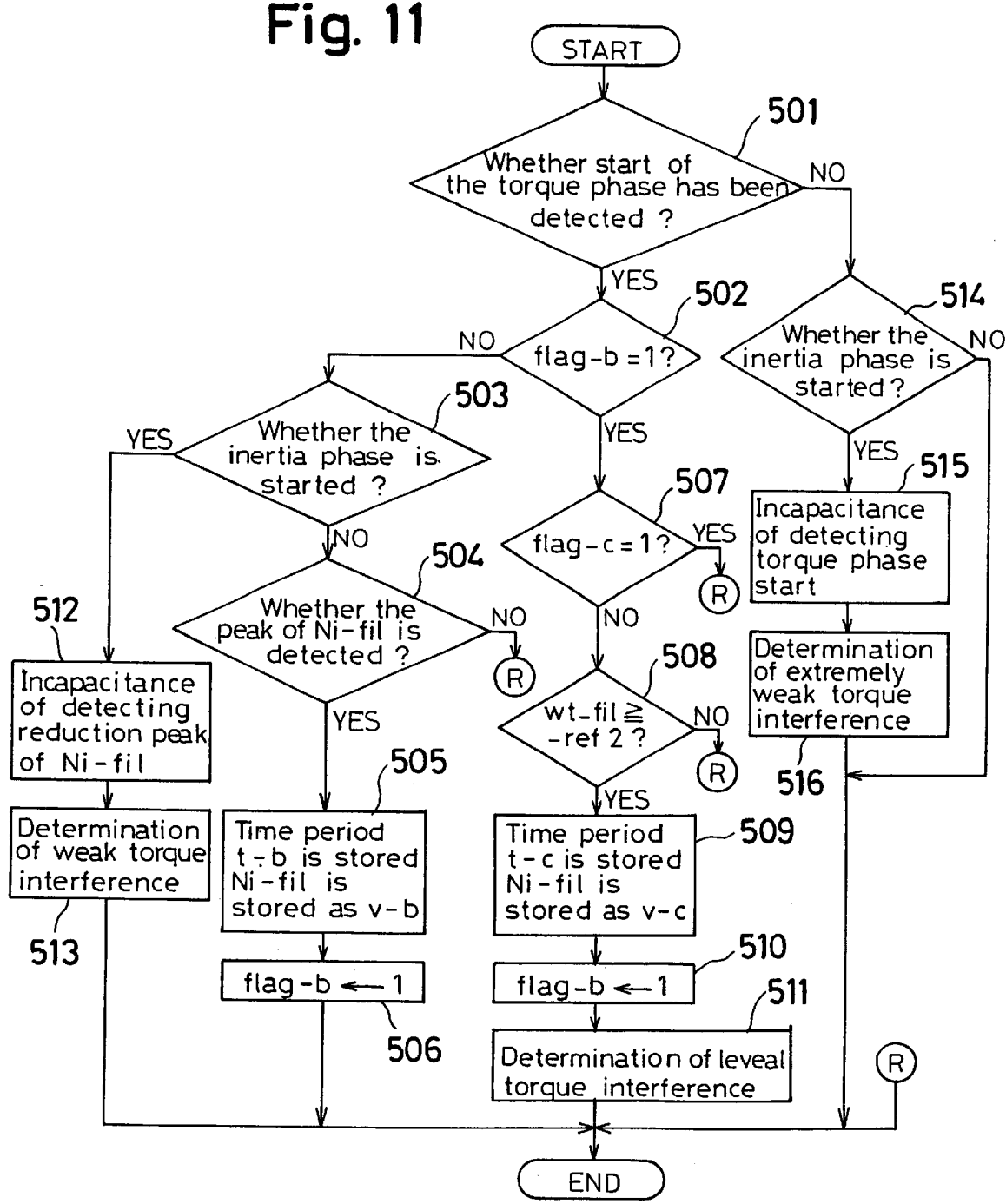
FIG. 11 is a flowchart showing the details of the processing control of step 304 in FIG. 8.
Figure 13:
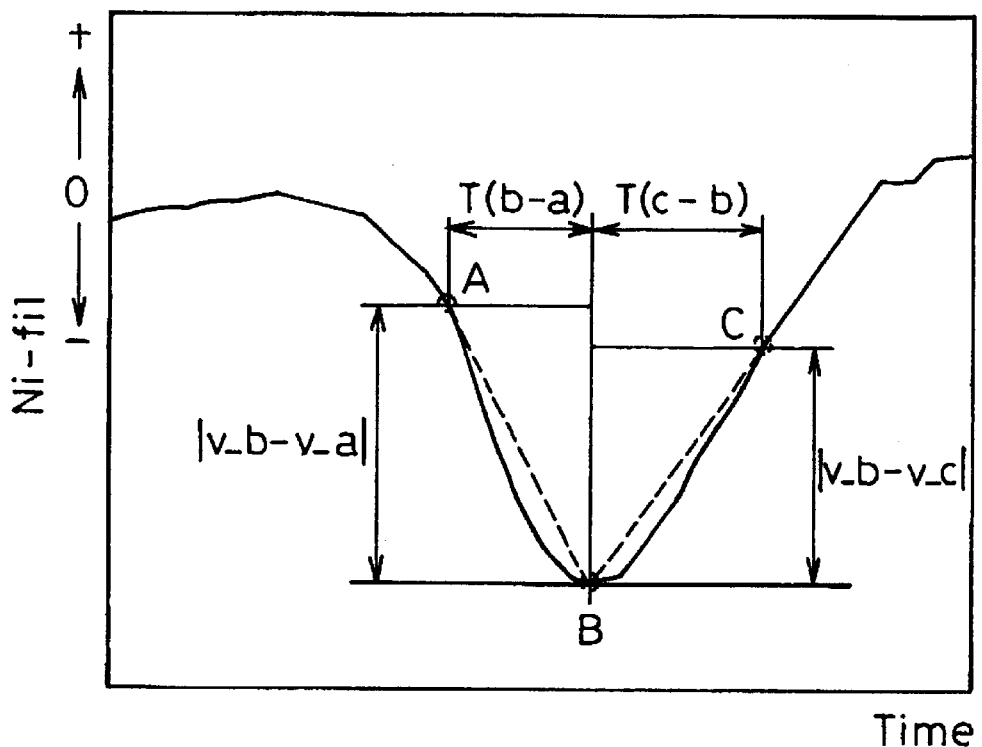
FIG. 13 illustrates time charts showing a behavior of characteristic detection 2 of speed shift.

Explaining the speed shift characteristic detection 2 at step 304 of the flowchart of FIG. 9, reference is made to the flowchart of FIG. 11 showing details of the processing control at step 304 and to FIG. 13 showing a change in the filter output value Ni_fil. According to the characteristic detection 2, an evaluation index ΔABC of torque interference intensity is calculated based on a change rate of the filter output value Ni_fil.

As shown in FIG. 11, at step 501, it is determined whether the start of the torque phase has been detected, that is whether the flag of flag_a is 1. When the start of the torque phase has been detected, the operation proceeds to step 502 where it is determined whether the flag of flag_b is 1. The flag of flag_b being 1 signifies that a peak of reduction of the filter output value Ni_fil (point B of FIG. 13) is detected. When the peak of reduction of the filter output value Ni_fil is not detected as a result of the determination at step 502, the operation proceeds to step 503 and it is determined whether the inertia phase is started based on the input shaft rotational speed Ni and the output shaft rotational speed No. When the inertia phase is not started as a result of the determination at step 503, the operation proceeds to step 504 where it is determined whether the peak of the filter output value Ni_fil is detected. When the peak of the filter output value Ni_fil is detected, the operation proceeds to step 505. Here, a time period t_b from the start of speed shift to a time point at which the peak of the filter output value Ni_fil is detected is stored, and the filter output value Ni_fil when the peak of the filter output value Ni_fil is detected is also stored as a value v_b. Thereafter, the flag of flag_b is set to 1 at step 506.

When the peak of the filter output value Ni_fil is not detected by the determination at step 504, the processing of steps 505 and 506 is not carried out.

When the peak of reduction of the filter output value Ni_fil is detected as a result of the determination at step 502, the operation proceeds to step 507 where it is determined whether a flag of flag_c is 1. The flag of flag_c of 1 signifies that the filter output value Ni_fil is recovered to be equal to or larger than the second threshold value of −ref2 after detecting the peak of the reduction of the filter output value Ni_fil.

When the filter output value Ni_fil is not detected to recover to be equal to or larger than the second threshold value of −ref2 as a result of the determination at step 507, the operation proceeds to step 508 and it is determined whether the filter output value Ni_fil is recovered to be equal to or larger than the second threshold value of −ref2. When the filter output value Ni_fil is detected to recover to be equal to or larger than the second threshold value of −ref2, the operation proceeds to step 509 where a time period t_c from start of speed shift to a time point where the filter output value Ni_fil is recovered to be equal to or larger than the second threshold value of −ref2 (point C in FIG. 13), is stored, the filter output value Ni_fil when the filter output value Ni_fil is recovered to be equal to or larger than the second threshold value of −ref2 is stored as a value v_c. Thereafter, the flag of flag_c is set to 1 at step 510 and the operation proceeds to step 511.

At step 511, there are calculated a time period T (b-a)= t_b-t_a from detection of the start of the torque phase (point A of FIG. 13) to detection of the peak of the filter output value Ni_fil (point B of FIG. 13), a time period T (c-b)=t_c-t_b from detection of the peak of the filter output value Ni_fil to when the filter output value Ni_fil is detected to recover to be equal to or larger than the second threshold value of −ref2, a difference AB=1v_b-v_a1 between the filter output value when start of the toque phase is detected (point A of FIG. 13) and the filter output value when the peak of the filter output value Ni_fil is detected (point B of FIG. 13), and a difference BC=1v_b-v_c1 between the filter output value when the peak of the filter output value Ni_fil is detected and the filter output value when the filter output value Ni_fil is detected to recover to be equal to or larger than the second threshold value of −ref2. Further, a change rate ΔAB=AB/T(b-a) when the filter output is reduced and a change rate ΔBC=BC/T(c-b) when the filter output is recovered are calculated, and the evaluation index AΔBC ΔAB+ΔBC of the torque interference intensity is then calculated.

Further, when the inertia phase is started as a result of the determination at step 503 via step 502 since start of the torque phase has been detected by the determination at step 501, "incapacitance of detecting reduction peak of filter output value Ni_fil" is constituted, the value t_b and the value v_b are respectively :reset to 0 at step 512. Thereafter, "determination of weak torque interference" is set at step 513.

Further, when the start of the torque phase has not been detected by the determination at step 501, the operation proceeds to step 514 and it is determined whether the inertia phase has been started based on the input shaft rotational speed Ni and the output shaft rotational speed No. When the inertia phase has been started, "incapacitance of detecting torque phase start" is constituted, and the value t_a and the value v_a are respectively reset to 0 at step 515. Thereafter, "determination of extremely weak torque interference" is set at step 516.

In sum, according to the speed shift characteristic detection 2, after detecting the start of the torque phase, at the time point where the minimum value (peak of reduction) of the filter output value Ni_fil is detected, the time period t_b from the start of the speed shift and the filter output value v_b are stored. When the operation proceeds to the inertia phase while start of the torque phase has not been detected (Ni_fil<-ref1 is not constituted) or while the peak of reduction has not been detected (Ni_fil<-ref2 is not constituted), the operation constitutes "determination of extremely weak torque interference" or "determination of weak torque interference", respectively. After the peak of reduction has been detected, at the time point of Ni_fil>-ref1, the filter output is regarded to recover from the reduction and the time period t_c from start of speed shift and the filter output value v_c at the time point are stored. After recovery of the filter output has been detected, the slope, that is the change rate $\Delta AB$ at the reduction and the change rate $\Delta BC$ at the recovery are calculated and the "torque interference intensity evaluation index $\Delta ABC= \Delta AB+\Delta BC$" is calculated by adding these change rates.

Figure 14:
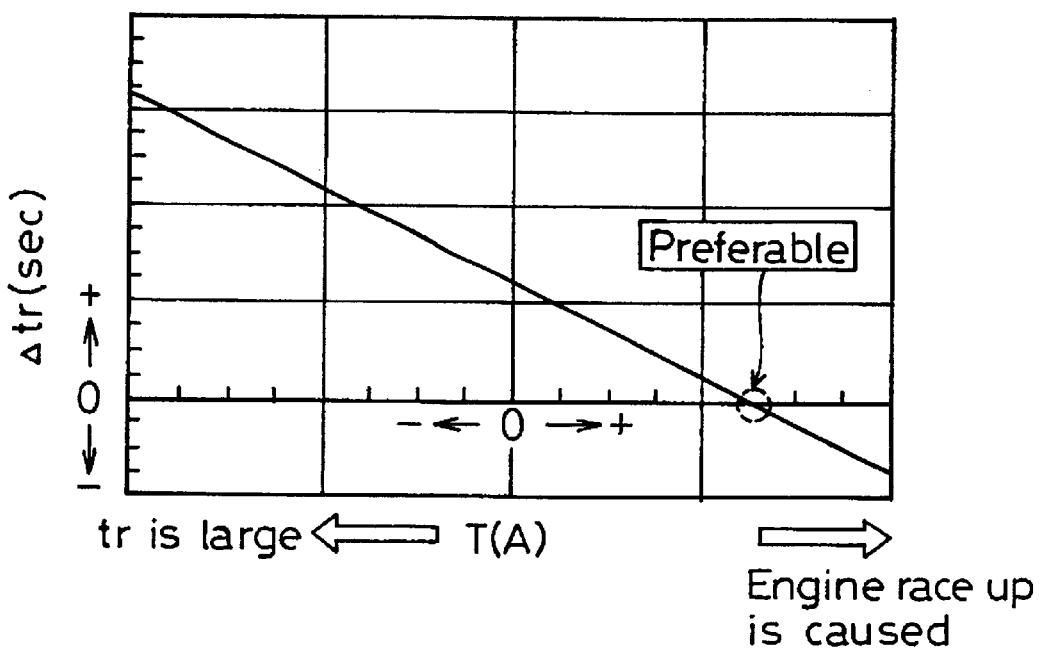
FIG. 14 is a graph showing the relationship between a detected time period T (A) and a correction amount $\Delta tr$.
Figure 15:
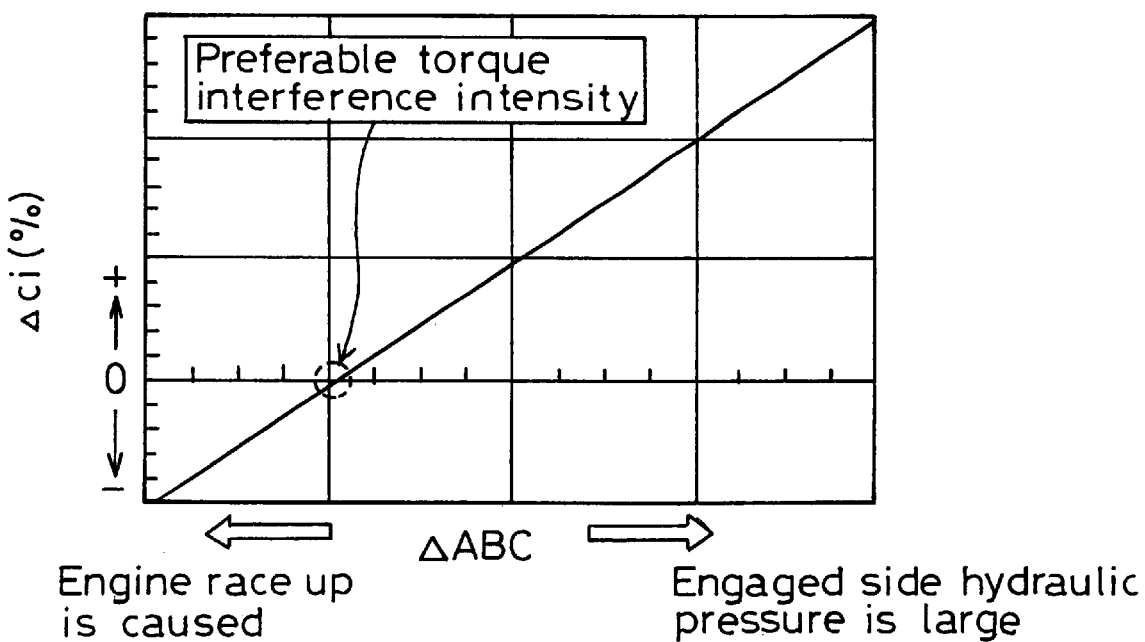
FIG. 15 is a graph showing the relationship between a detected torque interference intensity index $\Delta ABC$ and a correction amount $\Delta Ci$.

According to calculation of the learned correction amount at step 206 of FIG. 8, based on the time period T (A) calculated by the speed shift characteristic detection 1 and the graph of FIG. 14, the correction amount $\Delta tr$ is calculated in the 1–2 up shift at a succeeding time and based on the "evaluation index $\Delta ABC$", the "determination of extremely weak torque interference" and the "determination of weak torque interference" which are calculated or determined by the speed shift characteristic detection 2 and the graph of FIG. 15, the correction amount $\Delta Ci$ is calculated in 1–2 up shift at the succeeding time. Further, although the correction amount $\Delta Ci$ cannot be calculated from FIG. 15 with regard to respectives of "determination of extremely weak torque interference" and "determination of weak torque interference", it is apparently known that the engaged side hydraulic pressure is deficient and therefore, pertinent amounts of the correction amount $\Delta Ci$ are respectively outputted to a side of accelerating an increase in the engaged side hydraulic pressure.

FIG. 14 is a graph in which the degree to which the reference value tr0 of the release awaiting time period is corrected for purposes of constituting proper speed shift relative to the time period T (A), has previously been calculated by experiment. Further, FIG. 15 is a graph in which the degree to which the reference value Ci0 of the engaged side instruction value is corrected to be able to constitute proper speed shift relative to the torque interference intensity evaluation index $\Delta ABC$, has previously been calculated by experiment. Optimum values of the respective initial values tr and Ci are varied depending on the throttle opening degree and accordingly, the correction amounts need to switch depending on the throttle opening degree. Therefore, a number of sets of the graphs in FIG. 14 and FIG. 15 are prepared to deal with various values of the throttle opening degree, and in calculating the correction amounts a set of graphs dealing with the throttle opening degree at that time is selected and used from these. These graphs are formed into maps or replaced by the form of relative equations and mounted or applied to control programs of the microcomputer.

As has been explained, according to the method of detecting the start of the torque phase in the first aspect of the invention, the timing of starting the torque phase in the clutch to clutch speed shift can be relatively precisely detected and according to the speed shift control apparatus of the second aspect of the invention, the speed shift shock caused by the torque interference in the clutch to clutch speed shift can be relatively precisely controlled.

Further, according to the method of detecting the torque interference intensity in the third aspect of the invention, the torque interference intensity in the clutch to clutch speed shift can be relatively precisely detected and according to the speed shift control apparatus of the vehicular automatic transmission in the fourth aspect of the invention, the speed shift shock caused by the torque interference in the clutch to clutch speed shift can be relatively precisely restrained.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A method of detecting a start of a torque phase in clutch to clutch speed shift of a vehicular automatic transmission for simultaneously carrying out engagement and release of two frictional engaging elements provided to a reduction gear unit for switching speed stages of the reduction gear unit of the vehicular automatic transmission by connecting a turbine runner of a torque converter and an input shaft of the reduction gear unit to integrally rotate, said method comprising:

detecting a rotational speed of either the input shaft or an output shaft of the reduction gear unit in the clutch to clutch speed shift;

separating and extracting from the detected rotational speed a change component at a predetermined frequency or higher accompanied by generation of a transmission torque of an engaged side of the frictional engaging elements; and determining the start of the torque phase based on a reduction amount of the extracted change component.

2. The method according to claim 1, wherein said predetermined frequency is 1 Hz.

3. The method according to claim 1, wherein the start of the torque phase is determined by comparing the reduction amount of the extracted change component with a first threshold value and a second threshold value.

4. The method according to claim 3, wherein the start of the torque phase is determined when the reduction amount of the extracted change component falls to less than the first threshold value and thereafter becomes less than the second threshold value without recovering to be equal to or higher than the first threshold value.

5. A speed shift control apparatus of a vehicular automatic transmission for executing clutch to clutch speed shift for simultaneously carrying out engagement and release of two frictional engaging elements provided to a reduction gear unit for switching speed stages of the reduction gear unit of the vehicular automatic transmission by connecting a turbine runner of a torque converter and an input shaft of the gear reduction unit to integrally rotate, said speed shift control apparatus comprising:

hydraulic pressure controlling means for controlling engagement and release of the two frictional engaging elements;

instructing means for providing instruction with respect to the engagement and the release of the two frictional engaging elements by the hydraulic pressure controlling means in response to a speed shift start instruction;

means for detecting a rotational speed of either the input shaft or an output shaft of the reduction gear unit in the clutch to clutch speed shift, separating and extracting from the detected rotational speed a change component at a predetermined frequency or higher accompanied by generation of a transmission torque of an engaged side of the frictional engaging elements, and determining a start of a torque phase based on an amount of reduction of the extracted change component; and time interval detecting means for detecting a time period from start of release of a released side of the frictional engaging elements to start of the torque phase detected by the detecting means in operating the clutch to clutch speed shift;

the instructing means correcting a release awaiting time period from issuance of the speed shift start instruction to start of the release of the released side of the frictional engaging elements in the clutch to clutch speed shift at a succeeding time such that a way of overlapping torques allocated to the released side frictional engaging element and the engaged side frictional engaging element is ideally approximated based on the time period detected by the time period detecting means.

6. A method of detecting a start of a torque phase in clutch to clutch speed shift of a vehicular automatic transmission for simultaneously carrying out engagement and release of two frictional engaging elements provided to a reduction gear unit for switching speed stages of the reduction gear unit of the vehicular automatic transmission by connecting a turbine runner of a torque converter and an input shaft of the reduction gear unit to rotate integrally, said method comprising:

detecting a rotational speed of either the input shaft or an output shaft of the reduction gear unit in the clutch to clutch speed shift;

separating and extracting from the detected rotational speed a change component at a predetermined frequency or higher accompanied by generation of a transmission torque of an engaged side of the frictional engaging elements; and determining a torque interference intensity from a rate of reduction of the extracted change component.

7. The method according to claim 6, including determining whether the torque interference intensity exceeds a limit.

8. A speed shift control apparatus of a vehicular automatic transmission for executing clutch to clutch speed shift for simultaneously carrying out engagement and release of two frictional engaging elements provided to a reduction gear unit for switching speed stages of the reduction gear unit of the vehicular automatic transmission by connecting a turbine runner of a torque converter and an input shaft of the gear reduction unit to integrally rotate, said speed shift control apparatus comprising:

hydraulic pressure controlling means for controlling engagement and release of the two frictional engaging elements;

instructing means for providing instruction with respect to the engagement and the release of the two frictional engaging elements by the hydraulic pressure controlling means in response to a speed shift start instruction; and means for detecting a rotational speed of either the input shaft or an output shaft of the reduction gear unit in the clutch to clutch speed shift, separating and extracting from the detected rotational speed a change component at a predetermined frequency or higher accompanied by generation of a transmission torque of an engaged side of the frictional engaging elements, and determining start of a torque interference intensity from an amount of reduction of the extracted change component;

said instructing means correcting an initial value of an instruction value related to a hydraulic pressure of the engaged side of the frictional engaging elements in the clutch to clutch speed shift at a succeeding time such that a way of overlapping torques allocated to a released side of the frictional engaging elements and the engaged side of the frictional engaging elements are ideally approximated based on a torque interference intensity detected by the detecting means.

* * * * *